United States Patent [19]
Mizukami et al.

[11] Patent Number: 5,586,633
[45] Date of Patent: Dec. 24, 1996

[54] CLUTCH COVER ASSEMBLY

[75] Inventors: Hiroshi Mizukami; Norihisa Uenohara; Hiroshi Takeuchi, all of Neyagawa, Japan

[73] Assignee: Kabushiki Kaisha Daikin Seisakusho, Osaka, Japan

[21] Appl. No.: 417,993

[22] Filed: Apr. 6, 1995

Related U.S. Application Data

[62] Division of Ser. No. 117,425, Sep. 7, 1993, Pat. No. 5,431,268.

[30] Foreign Application Priority Data

| Sep. 7, 1992 | [JP] | Japan | 4-62612 U |
| Dec. 25, 1992 | [JP] | Japan | 4-346511 |

[51] Int. Cl.$^6$ ............................................. F16D 13/75
[52] U.S. Cl. ................................. 192/70.25; 192/111 A
[58] Field of Search .............................. 192/70.25, 111 A

[56] References Cited

U.S. PATENT DOCUMENTS

| 1,487,223 | 3/1924 | Fawick et al. |
| 3,938,636 | 2/1976 | Nerska |
| 4,844,226 | 7/1989 | Taketani |
| 4,924,991 | 5/1990 | Takeuchi |
| 5,186,298 | 2/1993 | Takeuchi |
| 5,251,737 | 10/1993 | Flotow et al. ............... 192/111 A |
| 5,419,418 | 5/1995 | Uenohara et al. |

FOREIGN PATENT DOCUMENTS

| 2606477 | 5/1988 | France |
| 2059016 | 6/1971 | Germany |
| 2920932 | 11/1979 | Germany |
| 3518781 | 11/1986 | Germany |
| 4239291 | 5/1993 | Germany |
| 4239289 | 5/1993 | Germany |
| 4322506 | 1/1994 | Germany |
| 4322677 | 1/1994 | Germany |
| 354253 | 7/1931 | United Kingdom |
| 1339000 | 11/1973 | United Kingdom |
| 2207965 | 2/1989 | United Kingdom |
| 2264989 | 9/1993 | United Kingdom |

OTHER PUBLICATIONS

English translation of DE–OS 2059016.

*Primary Examiner*—Andrea L. Pitts
*Attorney, Agent, or Firm*—Knobbe, Martens, Olson & Bear

[57] ABSTRACT

A clutch cover assembly is used for urging a friction member connected to an output member against an input rotation member and for releasing urging on the input rotation member. The clutch cover assembly comprises a clutch cover, a pressure plate, an urging member, a support mechanism and a movement regulation mechanism. The clutch cover is fixed to the input rotation member. The pressure plate is located within the clutch cover and urges the friction member. The urging member urges the pressure plate toward the friction member. The support mechanism is movable toward the friction member and supports the urging member. The movement regulation mechanism moves the support member toward the friction member according to wear displacement of the friction member.

16 Claims, 8 Drawing Sheets

CLUTCH COVER ASSEMBLY

This is a divisional application of U.S. application Ser. No. 08/117,425 filed Sep. 7, 1993, now U.S. Pat. No. 5,431,268.

BACKGROUND OF THE INVENTION

The present invention relates to a clutch cover assembly, particularly to a clutch cover assembly with a mechanism for keeping a pressing load constant by compensating for the wear on the friction members.

A clutch cover assembly is, generally, fixed to a flywheel of the engine and presses friction members of the clutch disc assembly against the flywheel in order to transmit the power of the engine to the transmission. Excessive wear on the friction members shortens the lives of the clutch disc assembly and the clutch disc assembly. It is possible to lengthen life of the clutch disc assembly by increasing effective thickness of friction members. For example, by attaching facings to the cushioning plate without using rivets.

The clutch cover assembly disclosed in Japanese Patent Laying-Open No. 27092/1998 maintains the pressing load of the diaphragm spring at its initial value as facings wear. This clutch cover assembly is shown in FIG. 10 and has a pressure plate 151 formed with an annular groove 152 in which a diaphragm spring posture maintenance mechanism 153 is arranged. The mechanism 153 comprises both an outer fulcrum ring 155 and an inner fulcrum ring 156 against which the outer periphery of the diaphragm spring 154 presses, slide keys 157 and 158 located between the fulcrum rings 155 and 156, and the grooved pressure plate. Both slide keys 157 and 158 are formed with an inclined surface such that axial height decreases radially outward. The fulcrum rings 155 and 156 are formed with inclined surfaces conforming to the inclined surfaces of the slide keys 157 and 58. The slide keys 157 and 158 are urged radially outward by springs 159 and 160, respectively.

The inner fulcrum ring 156 is moved toward the diaphragm spring 154 by the spring 160 and the slide keys 158 as facings 161 wear. Upon release, both fulcrums 155 and 156 move in concert, thus the posture of the diaphragm spring 154 and the pressing load of the diaphragm spring 154 is maintained at the initial value.

In the above-mentioned structure, it is necessary to form the groove 152 in the lateral surface of the pressure plate 151 to contain the spring posture maintenance mechanism 153. The groove 152 is difficult to fashion, deviation thus complicating accurate and correspondent movement of the fulcrum rings 155 and 156, affecting amount of wear on the facings 161. Therefore, design requirements make it difficult to maintain the initial pressing load of the diaphragm spring 154.

The above-mentioned structure is further affected when the engine rotation speed rlses, applying centrifugal force to the slide keys 157 and 158, thus making the slide keys move radially outward. In this case, even though the facings 161 are not worn, the slide keys 157 and 158 move so as to move the fulcrum rings 155 and 156 axially. As a result, it is impossible to maintain the posture of the initial pressing load of the diaphragm spring 154.

SUMMARY OF THE INVENTION

It is an object of the present invention to maintain the initial pressing load of the pressing member by compensating for displacement due to wear on friction members.

A clutch cover assembly according to an aspect of the present invention for urging friction members connected to an output member against an input rotation member and for releasing urging on the friction members. The clutch cover assembly comprises a clutch cover, a pressure plate, a pressing member, a support mechanism, and a movement regulation mechanism. The clutch cover is fixed to the input rotation member. The pressure plate is located within the clutch cover for pressing the friction members. The pressing member presses the pressure plate toward the friction members. The support mechanism, movable toward the friction members, supports the pressing member. The movement regulation mechanism moves the support mechanism toward the friction members according to the wear of the friction members.

In this clutch cover assembly, the pressing member is supported by the support mechanism and presses the pressure plate toward the friction members so that the friction members are sandwiched between the input rotation member and the pressure plate, whereby the power is transmitted from the input rotation member to the output member.

When the friction members are worn, the movement regulation mechanism moves the support mechanism toward the friction members so that the initial pressing posture and the initial pressing load of the pressing members are maintained. It is possible to maintain the initial pressing load correctly since the pressing posture of the pressing member is maintained by moving the pressing member toward the friction members. It is precise and of simple structure.

The foregoing and other objects and advantages of the present invention will become more apparent from the following detailed description, with reference to the accompanying drawings.

DESCRIPTION OF THE PREFERRED EMBODIMENTS

First Embodiment

Figure 1:
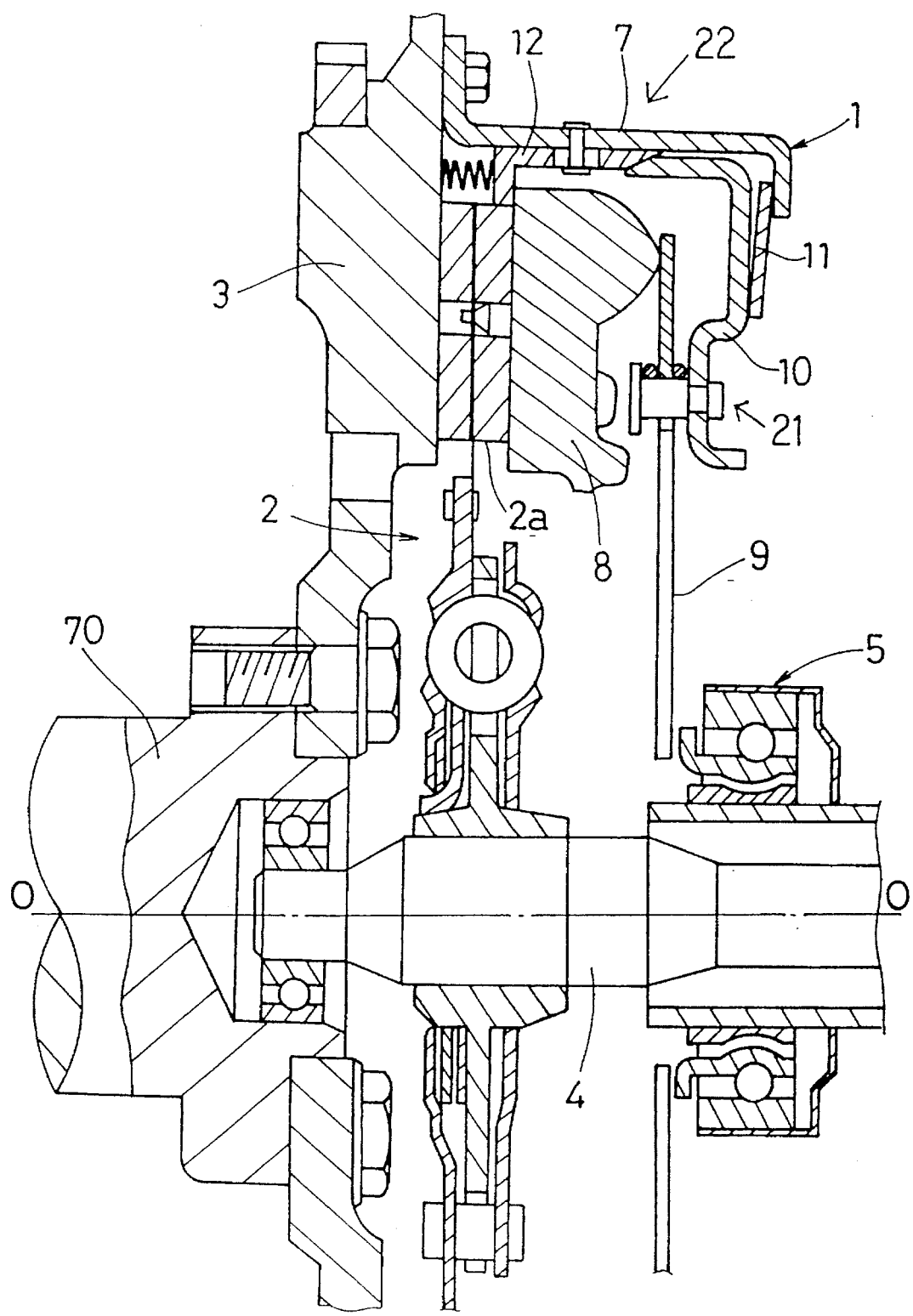
FIG. 1 is a schematic sectional view of a clutch to which the first embodiment of the present invention is applied.

FIG. 1 shows a clutch to which the first embodiment of the present invention is applied. The clutch is principally composed of a clutch cover assembly 1 fixed to a flywheel 3, and a clutch disc assembly 2. The flywheel 3 is fixed to a crankshaft 70 of the engine. A main drive shaft 4, extending from the transmission side (right in FIG. 1), is spline-engaged with the center of the clutch disc assembly 2. A release bearing 5 of the release assembly is located around the main drive shaft 4 so as to move in the axial direction.

Figure 2:
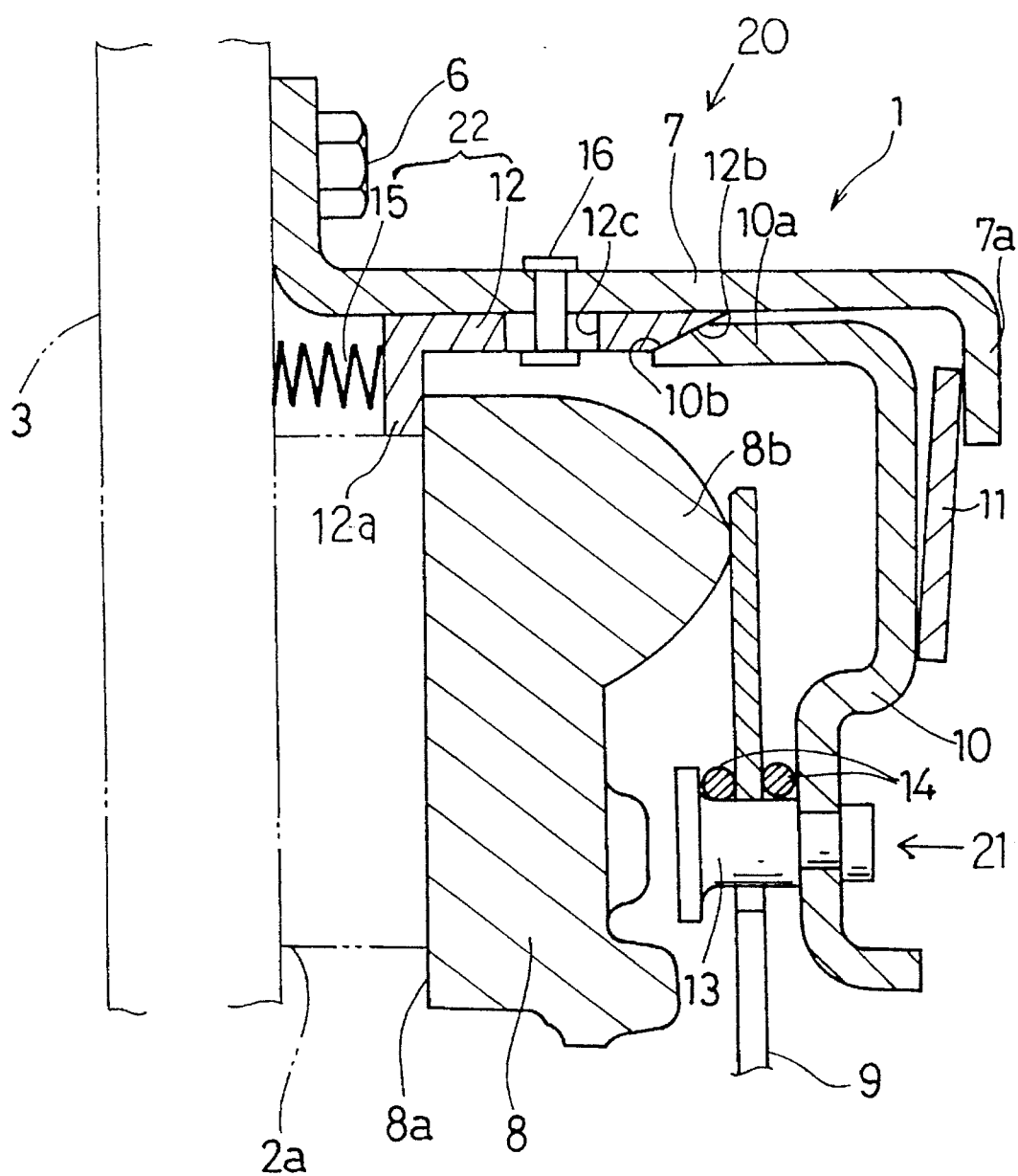
FIG. 2 is a sectional partial view of a clutch cover assembly of the first embodiment of the present invention.

The clutch cover assembly 1 comprises, as shown in FIG. 2, a first clutch cover 7 fixed to the flywheel 3 by bolts 6, a pressure plate 8 located within the first clutch cover 7, a diaphragm spring 9 for pressing the pressure plate 8 toward the flywheel 3, a support mechanism 21 for supporting the diaphragm spring 9, and a movement regulation mechanism 20 for moving the support mechanism 21 toward the flywheel 3 according to the displacement due to wear on facings 2a of the clutch disc assembly 2.

The pressure plate 8 is a generally annular member formed with a pressing surface 8a toward the flywheel 3 in order to clamp the facings 2a of the clutch disc assembly 2 between a friction surface of the flywheel 3 and the pressing surface 8a. The pressure plate 8 is also formed with a plurality of axial extensions located circumferentially with equal spacings therebetween.

The diaphragm spring 9 has a radially inward portion keeping in contact with the release bearing 5, a radially middle portion supported by the support mechanism 21, and a radially outward portion pressing the extensions 8b of the pressure plate 8 toward the flywheel 3.

In the above-mentioned structure, wherein the release bearing 5 pushes the radially inward portion of the diaphragm spring 9 toward the flywheel 3, the pressure against the pressure plate 8 is released.

The support mechanism 21 is principally composed of a second clutch cover 10, a plurality of stud pins 13 and two wire rings 14.

The second clutch cover 10 is a disc member located within the first clutch cover 7 so as to cover the rear surface of the pressure plate 8. The second clutch cover is connected to the first clutch cover 7 by strap plates (not shown) so as to be movable axially and not to be rotatable relative to the first clutch cover 7. Outer periphery end of the second clutch cover 10 is formed with a cylindrical portion 10a projecting toward the flywheel 3. Formed on the outer surface of the tip of the cylindrical portion 10a is a tapered surface 10b wherein the outside diameter of the cylindrical portion 10a becomes shorter as its proceeds to the tip. The plurality of stud pins 13 are fixed to the disc portion of the second clutch cover 10 with equidistant circumferential spacings therebetween. The stud pins 13 support the wire rings 14 which abut with the diaphragm spring 9.

The movement regulation mechanism 20 is mainly composed of a washer-type spring 11 pressing the second clutch cover 10 toward the flywheel 3, and a restriction mechanism 22.

Formed at the transmission-side end of the first clutch cover 7 is a bent portion 7a on which radially outward edge of the washer-type spring 11 is supported. Radially inward edge of the washer-type spring 11 presses the second clutch cover 10 toward the flywheel 3.

Figure 3:
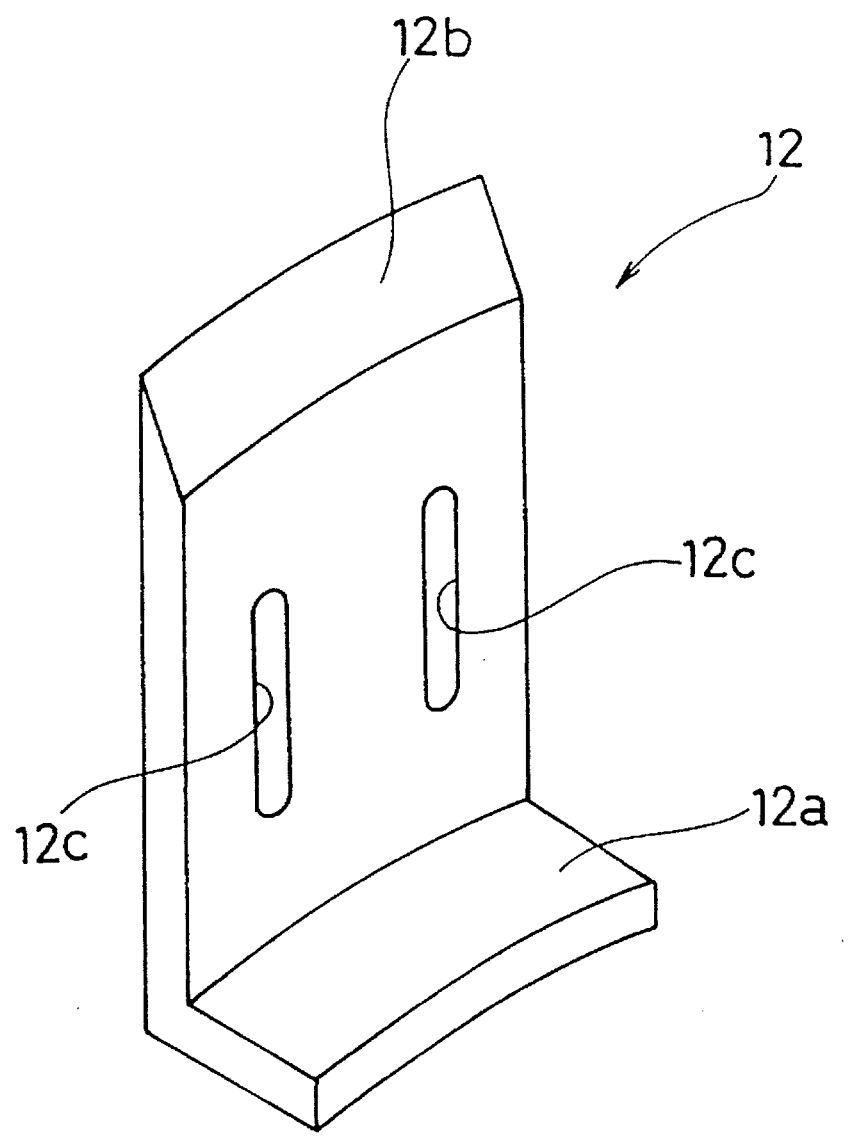
FIG. 3 is a perspective view of a wedge member.

The restriction mechanism 22 includes a plurality of wedge members 12 and springs 15. The wedge member 12 is, as shown in FIG. 3, a plate member with an L-like section. The wedge members 12 are located inside of a cylindrical wall of the first clutch cover 7 with circumferentially equidistant spaces therebetween. The wedge member 12 is curved so as to adhere closely to the inner surface of the first clutch cover 7. The wedge member 12 has a hook portion 12a at its one end keeping in contact with the pressing surface 8a of the pressure plate 8 so that when the pressure plate 8 moves toward the flywheel 3 the wedge member 12 moves with the pressure plate 8 toward the flywheel 3. The springs 15 are located between the support portions 12a of the wedge members 12 and the flywheel 3 so as to urge the wedge members 12 toward the transmission (not shown) side. The opposite end of the wedge member 12 is formed with a tapered surface 12b keeping in contact with the tapered surface 10b of the second clutch cover 10. The wedge members 12 is formed with two holes 12c extending axially (in the vertical direction in FIG. 3). Rivets 16 fixed to the first clutch cover 7 is inserted into the two holes 12c such that the wedge member 12 is connected to the first clutch cover 7 so as to be movable in the axial direction in the range of the holes 14c and not to be movable in the circumferential direction.

Now, the operation of the clutch will be explained.

When the radially outward end of the diaphragm spring 9 presses the pressure plate 8, the washer-type spring 11 presses the second clutch cover 10 toward the flywheel 3. The tapered surface 10b of the second clutch cover 10 presses the tapered surface 12b of the wedge members 12 so that the wedge members 12 are urged radially outward and are frictionally engaged with the inner surface of the first clutch cover 7 cylindrical wall. Consequently, the wedge members 12 can not move toward the flywheel 3. which prevents the second clutch cover 10 from moving toward the flywheel 3.

When the facings 2a are worn, the pressure plate 8 moves toward the flywheel 3 by the pressure of the diaphragm spring 9. At this time, the pressure plate 8 moves the wedge members 12 toward the flywheel 3 by the wear amount because the pressure of the pressure plate 8 is larger than the frictional engagement force between the wedge members 12 and the first clutch cover 7 and the urging force of the springs 15. As a result, the second clutch cover 10 is permitted to move toward the flywheel 3 by the wear displacement.

As mentioned before, the pressing portion and the radially middle portion of the diaphragm spring 9 move toward the flywheel 3 by the wear amount of the facing 2a so that the pressing posture and the initial pressing load of the diaphragm spring 9 are not changed. Accordingly, the effects of this structure are as follows;

(a) Lengthens life of the clutch by increasing effective wear time of the facings 2a.

(b) Provides continuously even torque transmission.

(c) Provides constant release load.

Since the diaphragm spring is moved in order to maintain pressing posture, the accuracy of the process and assembly is very high so that the pressing posture of the diaphragm spring 9 can be adjusted correctly according to the wear amount.

Furthermore, movement and posture of the diaphragm spring 9 are not affected by the engine rotation speed as in the prior art.

Second Embodiment

Figure 4:
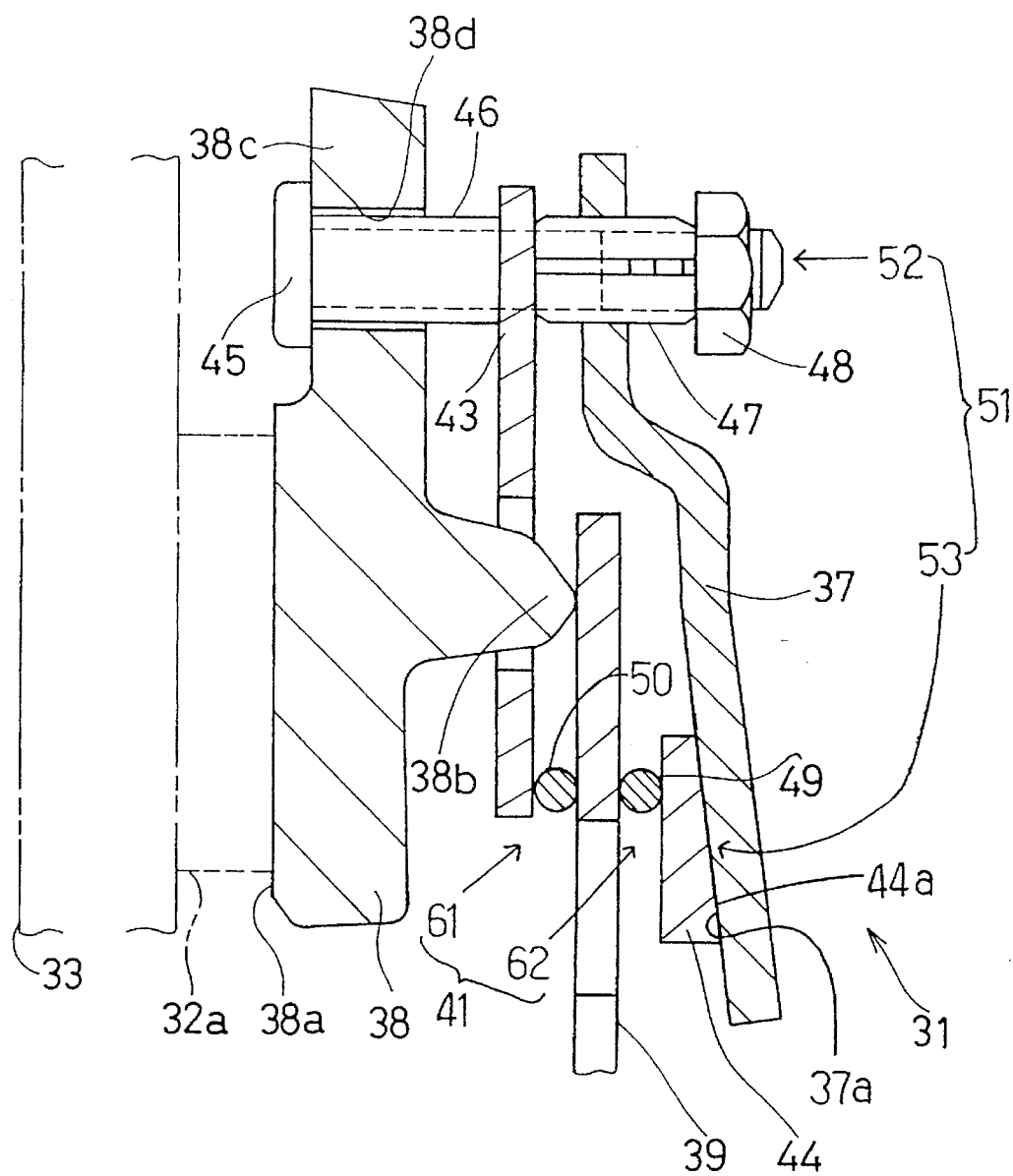
FIG. 4 is a view of the second embodiment, corresponding to FIG. 2.

A clutch cover assembly 31 shown in FIG. 4 is used in a push-type clutch as in the first embodiment. The clutch cover assembly 31 mainly comprises a clutch cover 37 fixed to a flywheel 33 of the engine (not shown), a pressure plate 38 located within the clutch cover 37, a diaphragm spring 39 for pressing the pressure plate 38 toward the flywheel 33, a support mechanism 41 for supporting the diaphragm spring 39, and a movement regulation mechanism 51 for moving the support mechanism 41 toward the facings 32a according to the wear amount of the facings 32a of the clutch disc assembly (not shown).

The clutch cover 37 has a disc portion with an inclined surface 37a approaching the pressure plate 38 as its goes radially outward.

The pressure plate 38 is generally annular, and is formed with a lateral pressing surface 38a for pressing the facing 32a against the flywheel 33. Formed on the opposite lateral side of the pressure plate 38 are extensions 38b that extend axially. Integrally formed on the outer periphery of the pressure plate 38 is a plurality of fixation portions 38c in which holes 38d are formed.

The diaphragm spring 39 has a radially inward end engaged with a release bearing (not shown), a radially middle portion supported by the support mechanism 41, and a radially outward end for pressing the extensions 38b of the pressure plate 38.

The support mechanism 41 is composed of a first support mechanism 61 for supporting the diaphragm spring 39 from the pressure plate 38 side, and a second support mechanism 62 for supporting the diaphragm spring 39 from the opposite side. The second support mechanism 62 comprises a wire ring 49 keeping in contact with the radially middle portion of the diaphragm spring 39 and a plurality of wedge members 44 located between the wire ring 49 and the clutch cover 37 disc portion. The wedge members 44 are formed with inclined surfaces 44a keeping in contact with the inclined surface 37a of the clutch cover 37. The inclined surfaces 44a are inclined such that axial height of the wedge members 44 becomes shorter as it goes radially outward.

The first support mechanism 61 is composed of a wire ring 50 keeping in contact with the radially middle portion of the diaphragm spring 39 and a disc-like support member 43. Radially inward end of the support member 43 supports the diaphragms spring 39 from the pressure plate 38 side through the wire ring 50. The support member 43 is formed with holes in the radially middle portion, corresponding to the extensions 38b of the pressure plate 38.

The movement regulation mechanism 51 is composed of a plurality of restrletlon meehanlsms 52 provided in the fixation portions 38c of the pressure plate 38, and an urging mechanism 53.

Each of the restrletlon mechanisms 52 is mainly composed of a bolt 45, a collar 46, a spring pin 47, and a nut 48. The bolt 45, with a head located on the pressing portion 38a side of the fixation portions 38c, penetrates the hole 38d of the fixation portion 38c, a hole of the support member 43, and a hole of the clutch cover 37. A tip of the bolt 45 is screwed into the nut 48. The collar 46 is sandwiched between the head of the bolt 45 and the support member 43. A eertaln space is kept between the collar 46 and the hole 38d of the fixation portion 38c. The spring pin 47 is sandwiched between the support member 43 and the nut 48. The spring pin 47 is inserted into the hole of the clutch cover 37 wherein it is compressed in the radial direction so that the spring pin 47 is frictionally engaged with the hole of the clutch cover 37. The force of the frletlonal engagement is larger than the releasing load of the diaphragm spring 39 to the support member 43 (the load appIled to the radially inward end of the support member 43 by the diaphragm spring 39 through the wire ring 50 at the clutch release operation), and is smaller than the pressing load of the diaphragm spring 39 against pressure plate 38. Consequently, the restriction mechanism 52 is restricted to move toward the flywheel 33 at the clutch release operation. That is, the support member 43 is also restricted to move toward the flywheel 33 at the clutch release operation.

The urging mechanism 53 is constituted by a wedge mechanism of the inclined surface 37a of the clutch plate 37 and the inclined surfaces 44 of the wedge members 44. When the centrifugal force is applied to the wedge members 44, the wedge members 44 urge the diaphragm spring 39 toward the pressure plate 38 through the wire ring 49.

The operation of the clutch will be explained.

When the diaphragm spring 39 presses the pressure plate 38, the support member 41 is prevented from moving axially by the restriction mechanism 52.

When the facing 32a are worn, the pressure plate 38 moves toward the flywheel 33. The pressure plate 38 moves the restriction mechanism 52 and the support member 43 toward the flywheel 33 by the wear amount. At this time, a space is developed between the radially inward end of the support member 43 and the diaphragm spring 39.

When the release operation is done after this condition, the radially middle portion of the diaphragm spring 39 moves toward the flywheel 33 and abuts against the radially inward end of the support member 43 through the wire ring 50. When the radially middle portion of the diaphragm spring 39 moves, a space is developed between the radially middle portion of the diaphragm spring 39 and the clutch cover 37. The space is filled by the wedge members 44 which are moved radially outward by the centrifugal force.

At the next pressing operation, the pressing posture of the diaphragm spring 39 is readjusted to the initial pressing posture because the repositioned wedge members 44 are again in contact with the diaphragm spring 39. That is, the initial pressing load of the diaphragm spring is always maintained, irrespective of the wear on the facings 32a. The effects obtained in this structure are the same with the effects (a)–(c) described in the first embodiment.

Since of the diaphragm spring is moved in order to maintain the pressing posture of the diaphragm spring, the accuracy of the process and assembly is very high so that the pressing posture of the diaphragm spring 9 can be adjusted correctly according to the wear amount.

In this embodiment, when the engine rotation speed rises the wedge members 44 tend to move radially outward by the centrifugal force. The wedge members 44 can, however, not move the support member 43 or the restriction mechanism 52 axially because the support member 43 has high rigidity and the frictional engagement force between the spring pin 47 and the clutch cover 37 is sufficiently large. Accordingly, the pressing posture of the diaphragm spring 39 can be maintained correctly so that the initial pressing road of the diaphragm spring 39 can be maintained.

Third Embodiment

Figure 5:
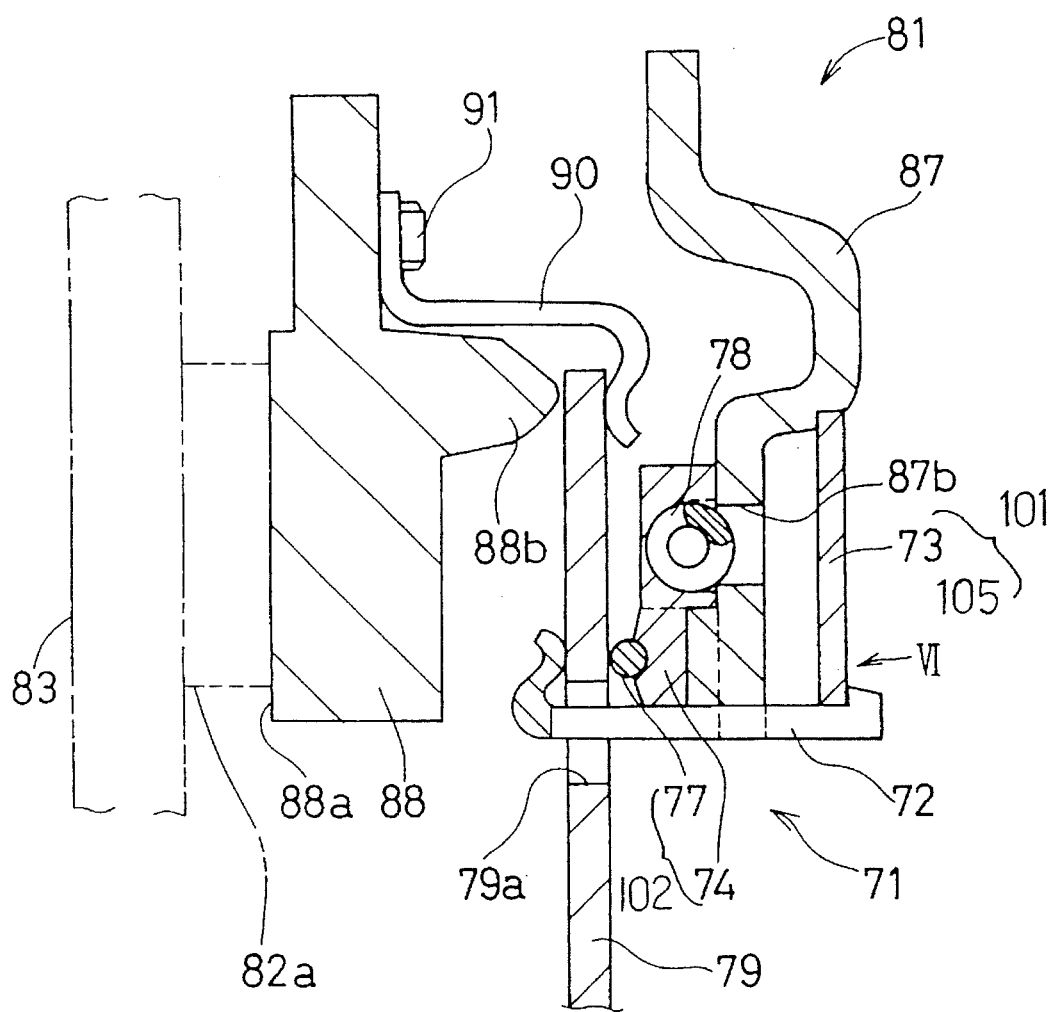
FIG. 5 is a view of the third embodiment, corresponding to FIG. 2.

A clutch cover assembly 81 shown in FIG. 5 is employed in a push-type clutch like the first and the second embodiments, and comprises a clutch cover 87 fixed to the flywheel 83 of the engine, a pressure plate 88 located in the clutch cover 87, a diaphragm spring 79 for pressing the pressure plate 88 toward the flywheel 83, and a support mechanism 71 for supporting the diaphragm spring 79, and a movement regulation mechanism 101 for moving the support mechanism 71 toward the facings 82a according to wear of the facings 82a of a clutch disc assembly (not shown).

The pressure plate 88 is generally annular and is provided with a pressing surface 88a for clamping the facings 82a of the clutch disc assembly between the flywheel 83 and itself. The pressure plate 88 is formed with annular projections 88b projecting in the axial direction on the diaphragm spring 79 side. The pressure plate 88 is fixed to the clutch cover 87 through strap plates (not shown) so as to be movable in the axial direction.

Radially inward end of the diaphragm spring 79 is in contact with the release bearing (not shown) and its radially middle portion is supported by the support mechanism 71. The diaphragm spring 79 has a radially outward end for pressing the projections 88b of the pressure plate 88, the radially outward end being held between a spring member 90 fixed to the pressure plate 88 by a bolt 91 and the projections 88b.

Figure 6:
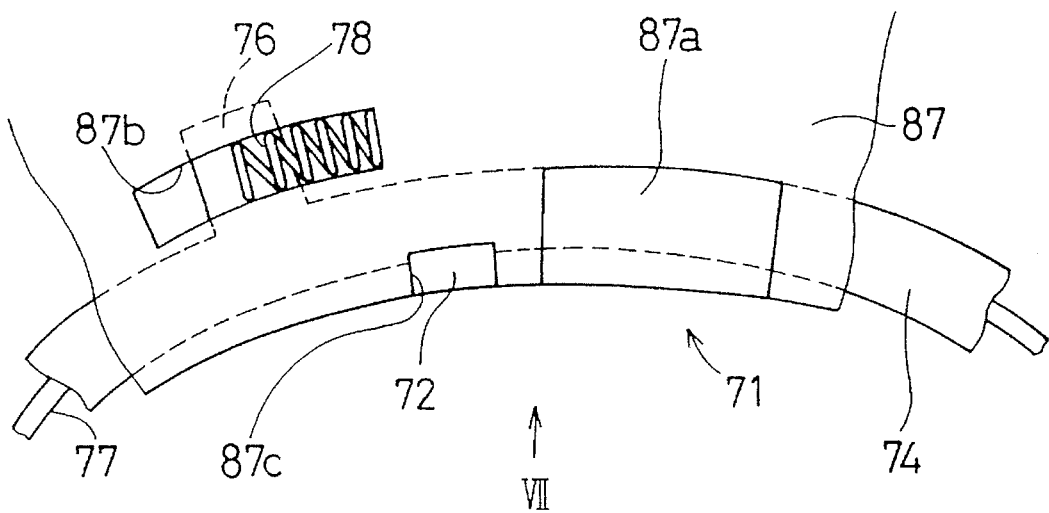
FIG. 6 is a view seen from an arrow VI in FIG. 5.
Figure 7:
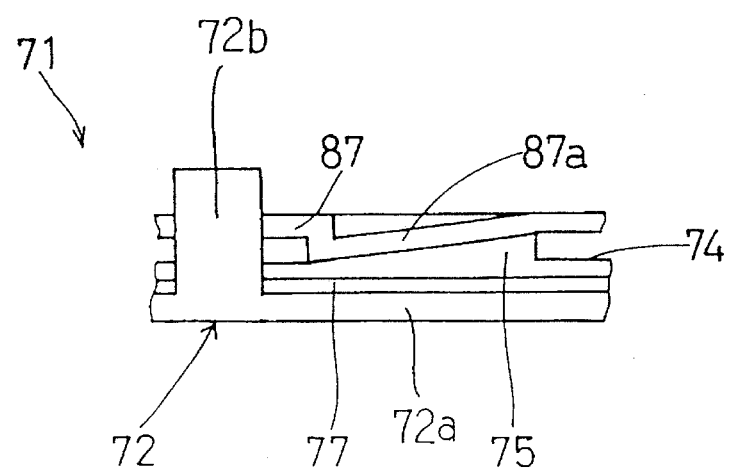
FIG. 7 is a view seen from an arrow VII in FIG. 6.
Figure 9:
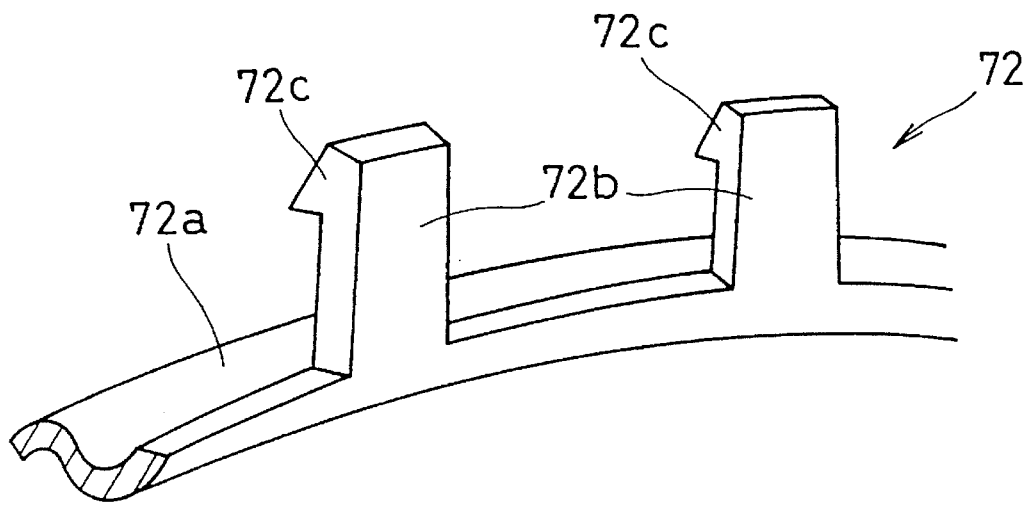
FIG. 9 is a partial perspective view of a lever plate.
Figure 10:
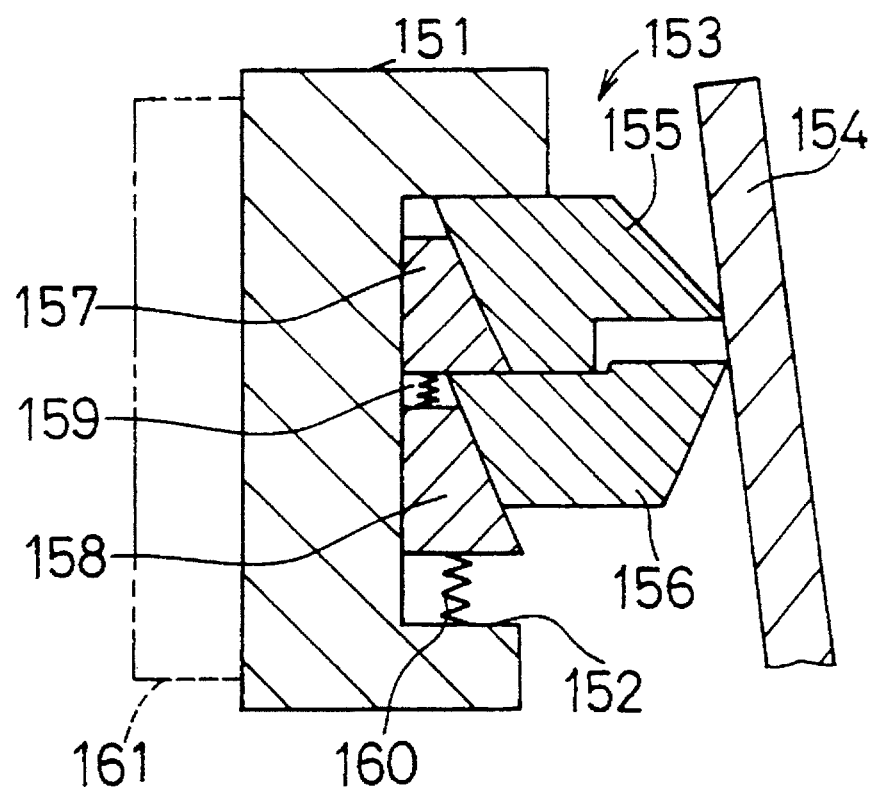
FIG. 10 is a view of a prior art, corresponding to FIG. 2.

The support mechanism 71 shown in FIG. 5 to FIG. 7 principally composed of a support mechanism 102 for supporting the diaphragm spring 79 from the opposite side of the pressure plate 88, and a lever plate 72 for supporting the diaphragm spring 79 from the pressure plate 88 side. The lever plate 72 is, as shown in FIG. 9, composed of a ring 72a which abuts against the flywheel 83 side of the diaphragm spring 79, and a plurality of projecting portions 72b extending axially from the inner side of the ring 72a. Each of the projecting portions 72b passes through a hole 79a in the diaphragm spring 79 and is supported in a cutout 87c (FIG. 6) made at radially inner end of the clutch cover 87 so as to be movable in the axial direction. The projecting portion 72b has an engagement portion 72c at the axial outer end.

Figure 8:
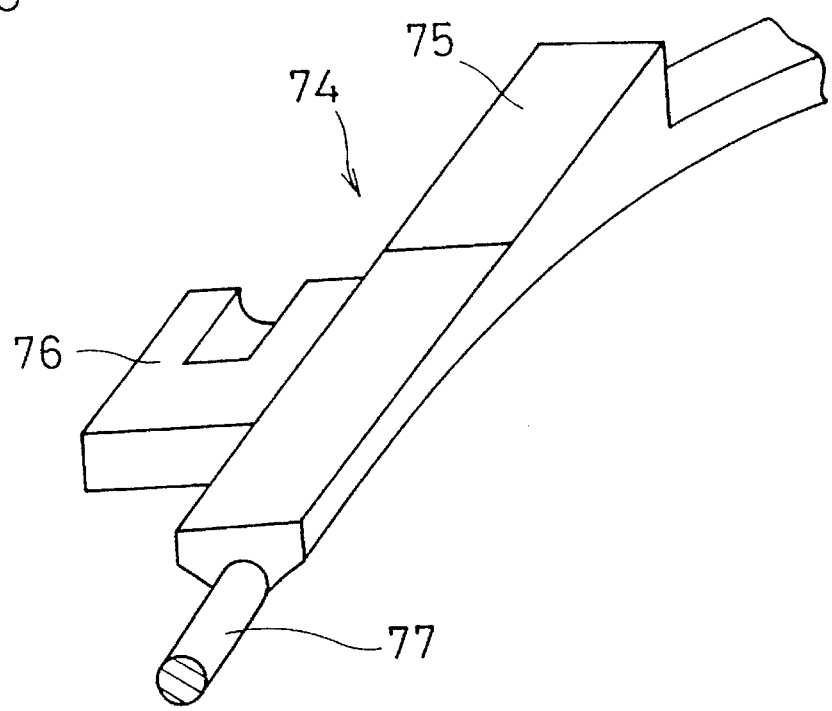
FIG. 8 is a perspective view of a ring member.

The support mechanism 102 is composed of a ring member 74 and a wire ring 77. The ring member 74 is disposed radially outward of the annular member 72 and between the diaphragm spring 79 and the clutch cover 87. The ring member 74 is shown in FIG. 6 to FIG. 8 and diaphragm spring 79 side thereof is in contact with the diaphragm spring 79 at the radially middle portion through the wire ring 77.

The movement regulation mechanism 101 is composed of a washer-type spring 73 and an urging mechanism 105.

The washer-type spring 73 has an outer end supported by the clutch cover 87 and an inner end supported by the engagement portions of the lever plate 72 and urging the lever plate 72 axially outward. Urging force of the washer-type spring 73 is set larger than the releasing load of the diaphragm spring 79 (load by which diaphragm spring 79 urges the lever plate 72 toward the flywheel 83 during the release operation).

The urging mechanism 105 is constituted by Inclined portions 75 formed in the ring member 74, extending in the circumferential direction, a plurality of inclined portions 87a in the clutch cover 87, corresponding to the inclined portions 75, and a plurality of coil springs 78.

The ring member 74 is also formed with portions 76 for receiving coil springs 78 at the outer periphery. The coil spring 78 has one end in contact with the spring receiving portions 76 and the opposite end abutting against holes 87b extending in the circumferential direction In the clutch cover 87. In this state, the coil spring 78 are compressed circumferentially so as to urge the ring member 74 relative to the clutch cover 87 in one direction (leftward in FIG. 6 and FIG. 7). The ring member 74 is always urged toward the flywheel 83 by the wedge mechanism composed of the inclined portions 75 of the ring member 74 and the inclined portions 87a of the clutch cover 87.

Next, the operation will be explained.

When the clutch engagement is released the fulcrum of the diaphragm spring 79 is positioned at a certain position by load balance of the releasing load of the diaphragm spring 79 and urging force of the washer-type spring 73.

If the facings 82a are worn during the pressing operation, the diaphragm spring 79 pressing portion moves toward the flywheel 15 with the pressure plate 88. As a result, pressing posture of the diaphragm spring 79 changes to a rising one.

At the next release operation, a releasing load of the diaphragm spring 39 becomes larger because its posture changes so that the releasing load is over the urging force of the washer-type spring 73 so as to move the lever plate 72 toward the flywheel 88 to a point where loads are balanced. A space between the wire ring 77 and the radially middle portion of the diaphragm spring 79 is then made. The ring member 74 moves toward the flywheel 83 to fill the space and abut against the diaphragm spring 79 radially middle portion. Since the radlally middle portion on the clutch cover 87 side of the diaphragm spring 79 is supported by the lever plate 72, at the next pressing operation pressing posture of the diaphragm spring 79 is the same with the initial posture so that the initial pressure load is maintained.

As explained before, if the facings 82a is worn at the pressing operation, the diaphragm spring 79 radially middle portion is moved toward the flywheel 83 according to the wear amount and maintained there during the next release operation so that axial distance between the projections 88b of the pressure plate 88 and the diaphragm spring 79 radially middle portion is kept constant. That is, the pressing posture of the diaphragm spring 79 is the same and the initial pressing load of the diaphragm spring 79 is always maintained. Effects obtained by this operation is the same with the effects (a)–(c) described in the first embodiment.

Since the diaphragm spring is moved forward the facings in order for maintaining its pressing posture spring, the process and assembly is precise so that the pressing posture of the diaphragm spring 9 correctly adjusted for wear amount.

Furthermore, in this embodiment, even if the engine rotation speed becomes higher, the ring member 74 does not press the radially middle portion of the diaphragm spring 79 more than its urging force because the movement of the ring member 74 is driven by the wedge mechanism functioning in the circumferential direction. Accordingly, the pressing posture and the initial pressing load of the diaphragm spring 79 are accurately maintained.

Various details of the invention may be changed without departing from its spirit nor scope. Furthermore, the foregoing description according to the present invention is provided for the purpose of illustration only, and not for the purpose of limiting the Invention as defined by the appended claims and their equivalents.

What is claimed is:

1. A clutch cover assembly, comprising:

a friction member connected to an output member, said friction member engaging with an input rotation member when pressed toward said output member;

a clutch cover fixed to said input rotation member;

a pressure plate located within said clutch cover for pressing said friction member;

an urging member for urging said pressure plate toward said friction member, said urging member being a diaphragm spring, radially outward end of which urges said pressure plate;

a support mechanism movable toward said friction member and for supporting said urging member, wherein said support mechanism includes a first support mechanism movable toward said friction member from said pressure plate side, and a second support mechanism movable toward said friction member from the opposite side of said pressure plate, said first support mechanism and said second support mechanism supporting radially middle portion of said diaphragm spring; and a movement regulation mechanism for moving said support mechanism toward said friction member according to wear displacement of said friction member, wherein said movement regulation mechanism includes a restriction member for permitting said first support mechanism to move toward said friction member according to wear displacement of said friction member, and an urging mechanism for urging said second support mechanism toward said friction member in order to move said second support mechanism according to movement of said first support mechanism, said movement regulation mechanism permits said support mechanism to move toward said friction member when said diaphragm spring releases its urging force against said pressure plate.

2. A clutch cover assembly according to claim 1, wherein said restriction mechanism permits said first support mechanism to move toward said friction member when said diaphragm spring releases its urging force against said pressure plate.

3. A clutch cover assembly according to claim 2, wherein said first support mechanism includes a support member, movable toward said friction member, for supporting said diaphragm spring from said pressure plate side, and said restriction mechanism includes an elastic member for restricting said support member from moving toward said friction member by urging said support member toward the opposite side of said friction member.

4. A clutch cover assembly according to claim 3, wherein urging force of said elastic member is determined such that it is at least equal to but not less than pressing force of said diaphragm spring pressing said support member toward said friction member in initial clutch release operation, and such that it becomes less than said pressing force of said diaphragm spring in the clutch release operation upon wear of said friction member, wherein urging posture of said diaphragm spring has changed to a raised one, allowing said support member to shift toward said friction member to a point at which said urging force of said elastic member becomes equal to said urging force of said diaphragm spring.

5. A clutch cover assembly according to claim 4, wherein said support member is composed of a ring in contact with said diaphragm spring, and a plurality of clasp extensions extending from said ring axially toward said clutch cover, passing through holes formed in said diaphragm spring; and said elastic member is a washer-type spring, a radially outer rim of which is supported by said clutch cover and a radially inner rim of which urges said plurality of clasp extensions in the opposite direction of said pressure plate.

6. A clutch cover assembly according to claim 5, wherein said second support mechanism is composed of a ring member located on one side of said diaphragm spring, said one side is opposite of said pressure plate, and a wire ring is fixed to said ring member and abutting with said diaphragm spring.

7. A clutch cover assembly according to claim 6, said urging mechanism is composed of a wedge mechanism extending circumferentially, and an urging member for urging said wedge mechanism circumferentially.

8. A clutch cover assembly according to claim 7, wherein said wedge mechanism is constituted by a first inclined surface formed in said ring member extending circumferentially, a second inclined surface formed in said clutch cover, abutting with said first inclined surface, and said urging member urges said first inclined surface of said ring member against said second inclined surface of said clutch cover in the circumferential direction, thereby urging said ring member toward said friction member.

9. A clutch cover assembly according to claim 8, wherein said ring member has a portion for receiving an end of said urging member;

said clutch cover is formed with a portion for receiving an opposite end of said urging member; and said urging member is elastically compressed between the respective receiving portions of said ring member and said clutch cover.

10. A clutch cover assembly according to claim 2, wherein said second support mechanism is composed of a ring member located on one side of said diaphragm spring, said one side is opposite of said pressure plate, and a wire ring is fixed to said ring member and abutting with said diaphragm spring.

11. A clutch cover assembly according to claim 10, wherein said urging mechanism is composed of a wedge mechanism extending circumferentially and an urging member for urging said wedge mechanism circumferentially.

12. A clutch cover assembly according to claim 11, wherein said wedge mechanism is constituted by a first inclined surface formed in said ring member extending circumferentially, a second inclined surface formed in said clutch cover, abutting with said first inclined surface, and said urging member urges said first inclined surface of said ring member against said second inclined surface of said clutch cover in the circumferential direction, thereby urging said ring member toward said friction member.

13. A clutch cover assembly according to claim 12, wherein said ring member has a portion for receiving an end of said urging member;

said clutch cover is formed with a portion for receiving an opposite end of said urging member; and said urging member is elastically compressed between the respective receiving portions of said ring member and said clutch cover.

14. A clutch cover assembly, comprising:

a friction member connected to an output member, said friction member engaging with an input rotation member when pressed toward said output member;

a clutch cover fixed to said input rotation member;

a pressure plate located within said clutch cover for pressing said friction member;

an urging member for urging said pressure plate toward said friction member, said urging member being a diaphragm spring, radially outward end of which urges said pressure plate;

a support mechanism movable toward said friction member and for supporting said urging member, said support mechanism supporting radially middle portion of said diaphragm spring; and a movement regulation mechanism for moving said support mechanism toward said friction member according to wear displacement of said friction member, wherein said movement regulation mechanism permits said support member to move toward said friction member when said diaphragm spring releases its urging force against said pressure plate.

15. A clutch cover assembly according to claim 14, wherein said support mechanism includes a first support mechanism movable toward said friction member for supporting said diaphragm spring from said pressure plate side, and a second support mechanism movable toward said friction member for supporting said diaphragm spring from the opposite side of said pressure plate, said movement regulation mechanism includes a restriction mechanism for permitting said first support mechanism to move toward said friction member according to the wear displacement of said friction member, and an urging mechanism for urging said second support mechanism toward said friction member in order to move said second support mechanism according to movement of said first support mechanism.

16. A clutch cover assembly, comprising:

a friction member connected to an output member, said friction member engaging with an input rotation member when pressed toward said output member;

a clutch cover fixed to said input rotation member;

a pressure plate located within said clutch cover for pressing said friction member;

an urging member for urging said pressure plate toward said friction member, said urging member being a diaphragm spring, radially outward end of which urges said pressure plate;

a support mechanism movable toward said friction member and for supporting said urging member, said support mechanism supporting radially middle portion of said diaphragm spring which is radially inward from a point where said diaphragm spring contacts said pressure plate; and a movement regulation mechanism for moving said support mechanism toward said friction member according to wear displacement of said friction member, wherein said movement regulation mechanism permits said support member to move toward said friction member when said diaphragm spring releases its urging force against said pressure plate.

* * * * *